A. SUEHY, Jr.

MACHINE FOR CLEANING PLASTIC MATERIALS.

APPLICATION FILED MAR. 26, 1920.

Reissued Mar. 8, 1921.

15,060.

3 SHEETS—SHEET 1.

Inventor
Albert Suehy, Jr.
By his Attorneys
Williams & Pritchard

A. SUEHY, JR.

MACHINE FOR CLEANING PLASTIC MATERIALS.

APPLICATION FILED MAR. 26, 1920.

Reissued Mar. 8, 1921.

15,060.

3 SHEETS—SHEET 2.

Inventor
Albert Suehy, Jr.
By his Attorneys
Williams & Pritchard

A. SUEHY, Jr.

MACHINE FOR CLEANING PLASTIC MATERIALS.

APPLICATION FILED MAR. 26, 1920.

Reissued Mar. 8, 1921.

15,060.

3 SHEETS—SHEET 3.

Inventor
Albert Suehy, Jr.
By his Attorneys
Williams & Pritchard

UNITED STATES PATENT OFFICE.

ALBERT SUEHY, JR., OF NEWARK, NEW JERSEY.

MACHINE FOR CLEANING PLASTIC MATERIALS.

15,060. Specification of Reissued Letters Patent. Reissued Mar. 8, 1921.

Original No. 1,247,173, dated November 20, 1917, Serial No. 167,850, filed May 10, 1917. Application for reissue filed March 26, 1920. Serial No. 369,119.

*To all whom it may concern:*

Be it known that I, ALBERT SUEHY, JR., a citizen of the United States, residing at Newark, county of Essex, and State of New Jersey, have invented a new and useful Improvement in Machines for Cleaning Plastic Materials, of which the following is a full, clear, and exact description, reference being had to the accompanying drawings, which form a part of this specification.

My invention relates to means for cleaning plastic substances, particularly chicle used in the manufacture of chewing gum.

Heretofore in cleaning chicle and other plastic substances for the removal of foreign substances such as bark and grit, the method has been to wash the substance with water. Washing has been found ineffective to thoroughly cleanse, and a certain amount of foreign matter is found in the finished product.

The object of my invention is to provide means for the positive removal of foreign matter from plastic substances.

Referring to the accompanying drawings, in which I have illustrated a preferred embodiment of my invention:—

Figure 1:
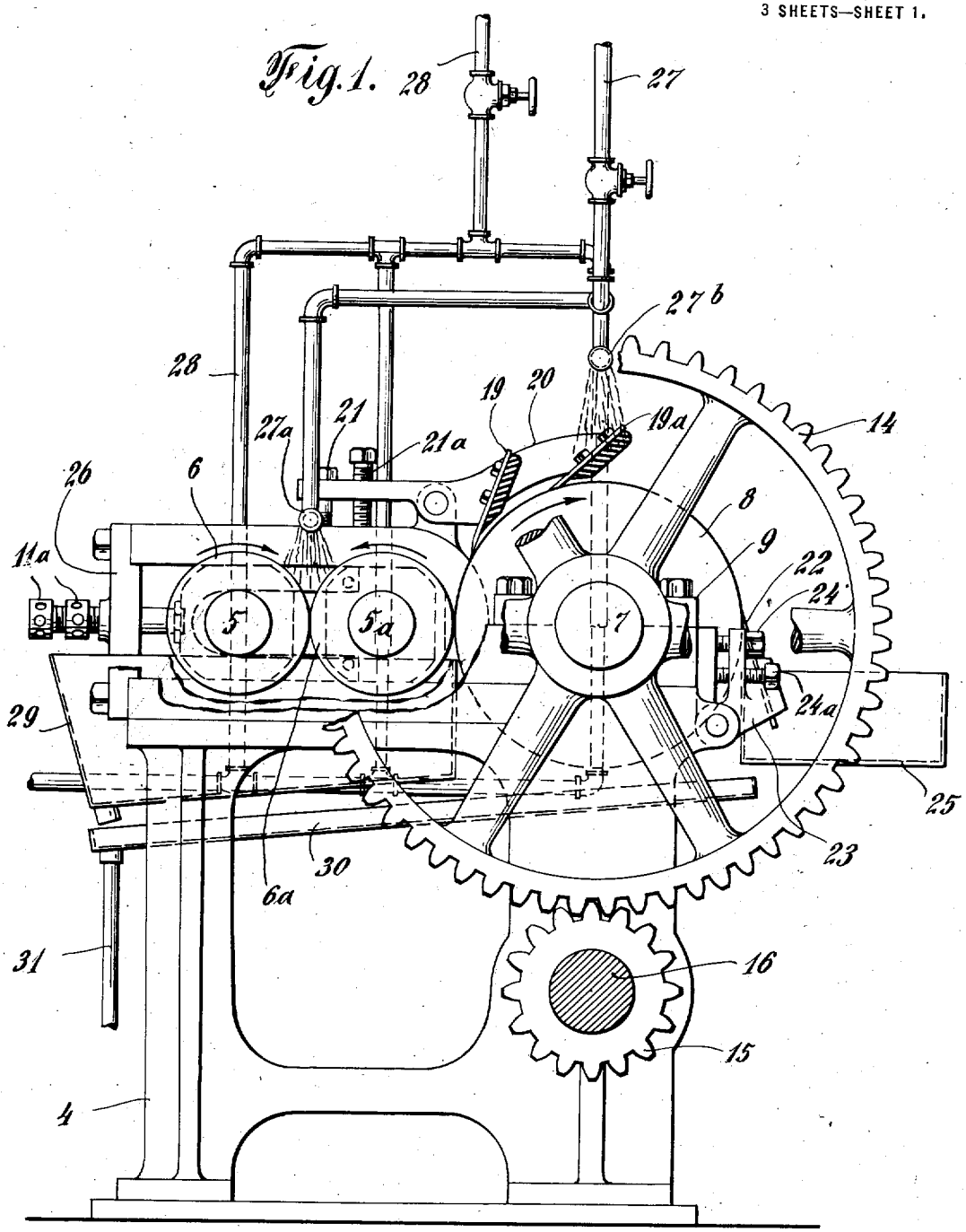
Figure 1 is a side elevation, partly broken away, of a machine for cleaning chicle and other plastic substances.
Figure 2:
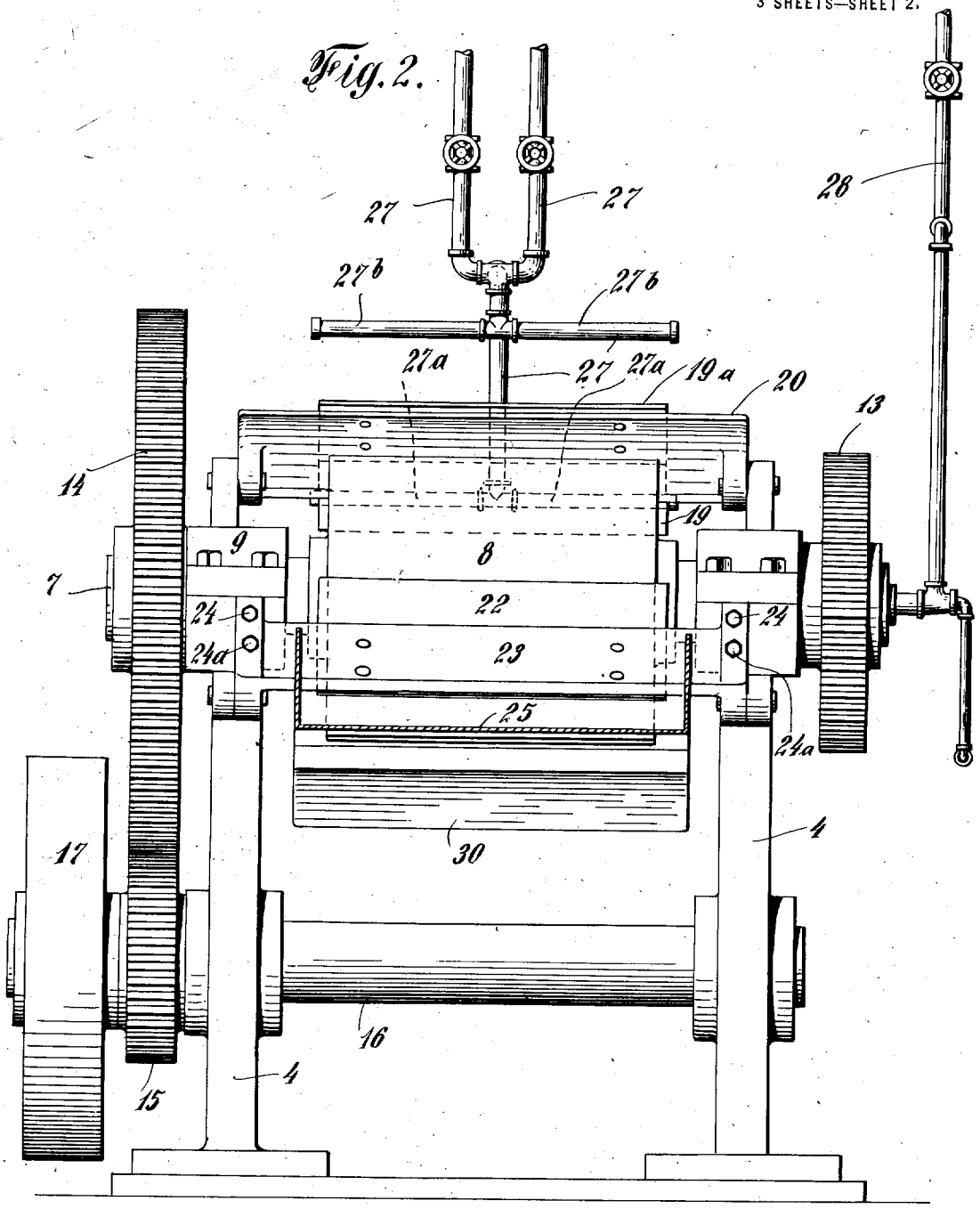
Fig. 2 is an end view of the machine looking from the right-hand side of Fig. 1.

To the frame 4 is suitably journaled at 9 the shaft 7 which carries the large cylindrical roller 8, adjacent to which are the two smaller rollers 6 and 6ª carried on the shafts 5 and 5ª journaled in the sliding blocks 10 and 10ª on the frame 4 and parallel to the shaft 7. The relative position of the rollers 6 and 6ª may be adjusted by the screws 11ª carried by the auxiliary frame 26 in connection with the slidable blocks in which they are journaled respectively, being provided to effect the desired adjustment. The main shaft 7 is provided with the gear 14 which meshes with the gear 15 carried by the driving shaft 16 which carries a pulley 17 for receiving power. The arm 20 is pivoted to the auxiliary frame 26 and extends over the roller 8. Above the roller, and suitably fastened to the arm 20, are scrapers 19 and 19ª. The scrapers are adjusted to and from the roller 8 by the adjustment of the arm 20 through its rearwardly extending portion in connection with the screws 21 and 21ª. The scrapers are also independently adjustable to and from the roller. At the front of the roller 8 is suitably mounted in the pivoted holder 23 the scraper 22 which is adjustable to and from the roller by means of the screws 24 and 24ª. Beneath the scraper is placed the pan 25.

Figure 3:
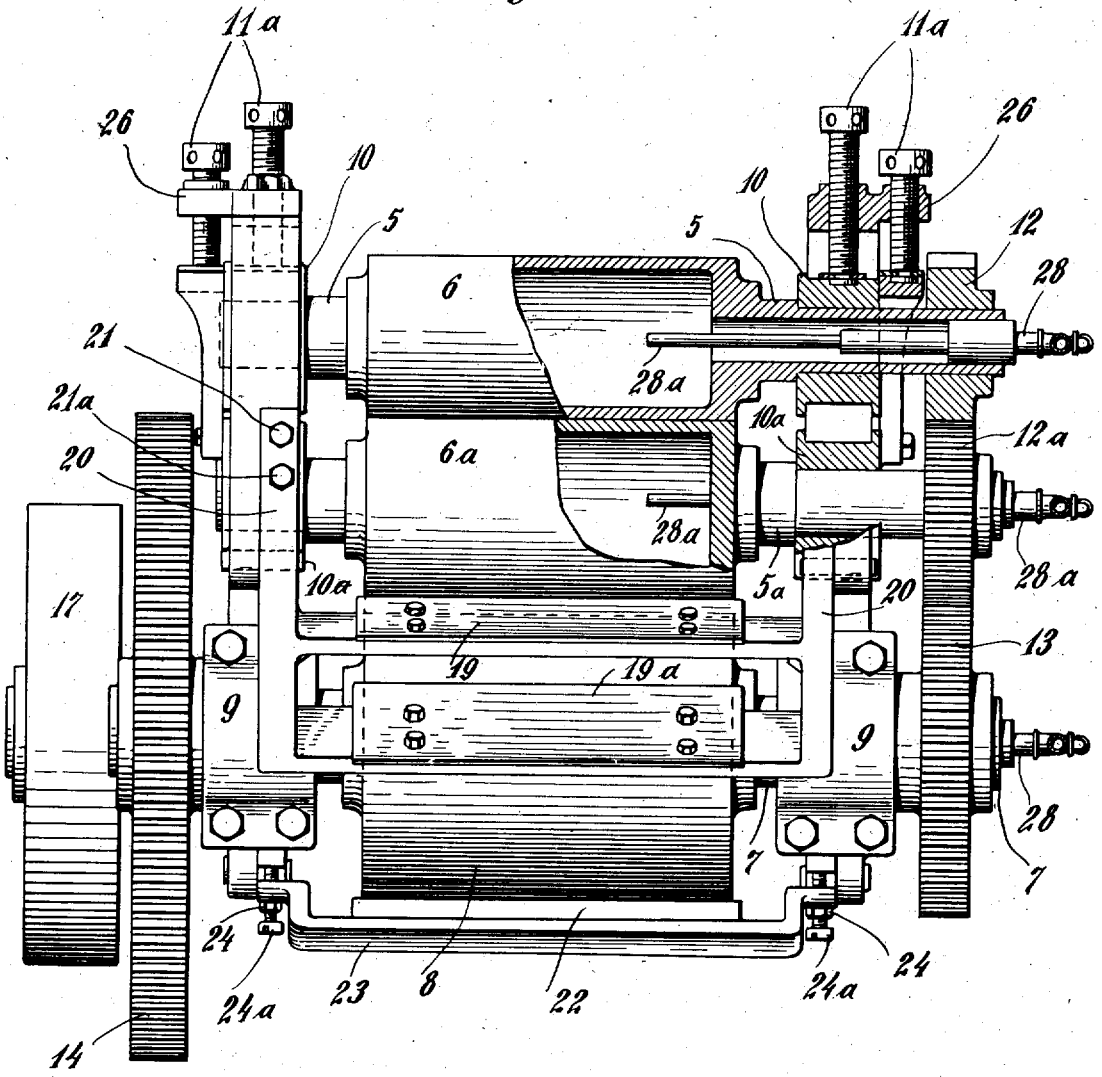
Fig. 3 is a plan view, partly in section, of the subject of Figs. 1 and 2.

Above and between the rollers 6 and 6ª is positioned the water spray nozzle 27ª carried by a suitable supply pipe 27; a similar nozzle 27ᵇ, supplied by the pipe 27, is positioned above the roller 8. Pans 29 and 30 with drain pipe 31 are positioned beneath the rollers. The pan 29 is made relatively deep, so that the lower part of the rollers 6 and 6ª will revolve in water. The pipe 28 is connected with a source of heat and run into the pan 29 to maintain a relatively high temperature in the water. Also branches 28ª from the pipe 28 are run into the hollow cylinders 6, 6ª and 8, for heating these cylinders, as shown in Fig. 3.

In practice, after the machine has been set in motion, water is sprayed on the rollers through the sprays 27ª and 27ᵇ. Chicle, or other plastic substance which it is desired to clean, which has been previously heated, is then fed between the rollers 6 and 6ª where it is subjected to a stream of water. The chicle adheres to the rollers and is thoroughly washed by being carried through the heated water in pan 29. The chicle which is carried by the roller 6ª comes in contact with and is gradually transferred to the roller 8 which, traveling in the direction of the arrow, carries it to the scraper 19 and under the spray 27ᵇ. The scraper 19 is adjusted toward the surface of the roller 8 sufficiently close to prevent the passage beneath it of any but very small particles of foreign matter, thus partially cleaning the chicle. The chicle is then carried by the roller to the scraper 19ª which is adjusted to leave only a minute clearance from the surface of the roller. The scraper 19ª holds up all the remaining foreign matter. A minute film of cleaned chicle is left on the roller and passes to the scraper 22 which removes it and permits it to drop into the pan 25, where it is collected for use. The chicle which adheres to the roller 6 is gradually transferred to the roller 6ª and from there to roller 8. The chicle, which is held up by the scrapers 19 and 19ª being very plastic from heat, gradually is passed under the scrapers under the influence of the roller 8, leaving the more solid bark, grit, etc. Thus, in time, all of the chicle passes under the scrapers and collects in the pan 25 thoroughly cleaned.

My invention may be modified by omitting the rollers 6 and 6[a] and the sprays 27[a] and 27[b], and feeding the heated chicle direct to the roller 8 to which it adheres and by which it is carried through the scrapers and cleaned. The spray 27[b] may, of course, be used where the roller 8 is used alone, if desired.

I do not limit my invention to the cleaning of chicle as it is effective for cleaning any plastic substance or any substances which may be rendered plastic by heat.

Having now fully described my invention, what I desire to claim and protect by Letters Patent is:—

1. In a machine for cleaning plastic substances, in combination, a roller adapted to carry on its surface the substance to be cleaned, means for supplying such substance to the surface of the roller, a hard edge scraper adapted to remove particles of foreign matter from said substance while leaving a film of said substance adhering to the surface of the roller, and means for removing said cleaned substance from the surface of the roller.

2. In a machine for cleaning plastic substances, in combination, a roller adapted to carry on its surface the substance to be cleaned, means for supplying such substance to the surface of the roller, a hard-edged scraper having its hard scraping edge spaced from said roller so as to remove particles of foreign matter from said substance while leaving a film of said substance adhering to the surface of the roller, and a scraper adapted to remove said cleaned substance from the roller.

3. In a machine for cleaning plastic substances, in combination, a cylinder to the periphery of which the substance to be cleaned is adapted to be conveyed, means to revolve the cylinder, a scraper of hard and inelastic material positioned close to, but spaced appreciably from, the periphery of the cylinder, adapted to prevent the passage of appreciable particles of foreign matter but to allow the formation of a film of plastic material, and a second scraper beyond the first scraper and positioned nearer the axis of the cylinder than the first scraper so as to scrape from its periphery more or less of the film of material adhering to the cylinder's periphery.

4. In a machine for cleaning plastic substances, in combination, a cylinder, a plurality of scrapers coöperating with the periphery of the cylinder and located at different distances from its axis, and a pair of cylinders, one adjacent and coöperating with the first cylinder and the other remote from the first cylinder but adjacent to and coöperating with the other cylinder of the pair, the cylinders of the pair being adjustable relatively to each other.

5. In a machine for cleaning plastic substances, in combination a cylinder adapted to carry the substance to be cleaned, means to revolve the cylinder, a plurality of scrapers positioned adjacent to the surface of said cylinder, one of said scrapers being practically in contact with said surface, and a spray nozzle positioned above said cylinder.

6. In a machine for cleaning plastic substances, in combination a pair of cylinders adjustable relatively to each other, a third cylinder adjacent one of said pair, a plurality of scrapers positioned adjacent to said third cylinder, one of said scrapers being in contact with the surface of said last named cylinder, and a pair of spray nozzles, one located above and between said first named cylinder and the other located above said last named cylinder.

In testimony whereof, I have affixed my signature to this specification.

ALBERT SUEHY, Jr.